US011775519B2

(12) United States Patent
Balaka

(10) Patent No.: US 11,775,519 B2
(45) Date of Patent: Oct. 3, 2023

(54) OPTIMIZING INDEXES FOR ACCESSING DATABASE TABLES

(71) Applicant: salesforce.com, inc., San Francisco, CA (US)

(72) Inventor: Jyothi Balaka, San Ramon, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/225,280

(22) Filed: Apr. 8, 2021

(65) Prior Publication Data

US 2022/0327126 A1 Oct. 13, 2022

(51) Int. Cl.

*G06F 16/24* (2019.01)
*G06F 16/2453* (2019.01)
*G06N 20/00* (2019.01)
*G06F 16/22* (2019.01)

(52) U.S. Cl.

CPC ...... *G06F 16/24539* (2019.01); *G06F 16/221* (2019.01); *G06F 16/2282* (2019.01); *G06N 20/00* (2019.01)

(58) Field of Classification Search

CPC ................................................ G06F 16/24539
USPC ........................................................ 707/791
See application file for complete search history.

(56) References Cited

U.S. PATENT DOCUMENTS 5,577,188 A 11/1996 Zhu
5,608,872 A 3/1997 Schwartz
5,649,104 A 7/1997 Carleton
5,715,450 A 2/1998 Ambrose et al.
5,761,419 A 6/1998 Schwartz
5,819,038 A 10/1998 Carleton
5,821,937 A 10/1998 Tonelli et al.
5,831,610 A 11/1998 Tonelli et al.
5,873,096 A 2/1999 Lim et al.
5,918,159 A 6/1999 Fomukong et al.
5,963,953 A 10/1999 Cram et al.
6,092,083 A 7/2000 Brodersen et al.
6,161,149 A 12/2000 Achacoso et al.
6,169,534 B1 1/2001 Raffel et al.
6,178,425 B1 1/2001 Brodersen et al.

(Continued)

FOREIGN PATENT DOCUMENTS

EP 3435257 A1 * 1/2019 ............ G06F 16/211

*Primary Examiner* — Syling Yen

(74) *Attorney, Agent, or Firm* — Dergosits & Noah LLP; Todd A. Noah

(57) ABSTRACT

A system executes a set of database operations and determines counts of instances that each key is specified for a corresponding column by any database operations on a database table. The system identifies each key which is associated with any determined count that satisfies a threshold as a corresponding frequently accessed key. The system creates an optimized index for each column which stores any frequently accessed key. The system inserts each frequently accessed key into a corresponding optimized index. The system receives a database operation that specifies a specific key for a specific column in the database table. If any optimized index matches the specific column and stores any frequently accessed key that matches the specific key, then the system references a matching frequently accessed key in a matching optimized index to access a record, which is associated with the specific column and the specific key, via the database table.

20 Claims, 6 Drawing Sheets

FIG. 1A

(56) References Cited

U.S. PATENT DOCUMENTS

| | | | |
|---|---|---|---|
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,031,985 | B1 * | 4/2006 | Pecheny .......... G06F 16/90344 |
| 7,062,502 | B1 | 6/2006 | Kesler |
| 7,340,411 | B2 | 3/2008 | Cook |
| 7,356,482 | B2 | 4/2008 | Frankland et al. |
| 7,401,094 | B1 | 7/2008 | Kesler |
| 7,620,655 | B2 | 11/2009 | Larsson |
| 7,698,160 | B2 | 4/2010 | Beaven et al. |
| 7,730,478 | B2 | 6/2010 | Weissman |
| 7,779,039 | B2 | 8/2010 | Weissman et al. |
| 7,779,475 | B2 | 8/2010 | Jakobson et al. |
| 7,851,004 | B2 | 12/2010 | Hirao et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,209,308 | B2 | 6/2012 | Jakobson et al. |
| 8,275,836 | B2 | 9/2012 | Beaven et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2009/0063415 | A1 | 3/2009 | Chatfield et al. |
| 2009/0100342 | A1 | 4/2009 | Jakobson |
| 2009/0177744 | A1 | 7/2009 | Marlow et al. |
| 2012/0233137 | A1 | 9/2012 | Jakobson et al. |
| 2013/0218948 | A1 | 8/2013 | Jakobson |
| 2013/0218949 | A1 | 8/2013 | Jakobson |
| 2013/0218966 | A1 | 8/2013 | Jakobson |
| 2014/0359537 | A1 | 12/2014 | Jakobson et al. |
| 2015/0007050 | A1 | 1/2015 | Jakobson et al. |
| 2015/0095162 | A1 | 4/2015 | Jakobson et al. |
| 2015/0172563 | A1 | 6/2015 | Jakobson et al. |
| 2020/0334251 | A1 * | 10/2020 | Canim .................. G06F 16/258 |
| 2022/0043585 | A1 * | 2/2022 | Senyuk ................. G06F 3/0647 |

* cited by examiner

OPTIMIZING INDEXES FOR ACCESSING DATABASE TABLES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A database may use tables to store digital objects for each person and/or organization that may be able to help in achieving a goal. A database table can be a set of values that are stored in vertical columns, which may represent fields, and horizontal rows, which may represent records, with an intersection between a column and a row being referred to as a cell. A column can be a vertical section of a database table. A specific column can be a clearly identified vertical section of a database table. A row can be a horizontal section of a database table. In alternative embodiments, a columnar database table can be a set of values that are stored in horizontal rows, which may represent fields, and vertical columns, which may represent records. When applied to a columnar database, this present disclosure's references to columns and fields would apply to rows and records, and this present disclosure's references to rows and records would apply to columns and fields.

A record can be the storage of at least one value in a persistent form. Although the following examples describe a database for a customer relationship management (CRM) system, embodiments of the present disclosure can be applied to any type of database for any category of database management system. Examples of fields for account records, contact records, lead records, and/or opportunity records include an organization's name, an organization's industry, an organization's size, an organization's revenue, an organization's stock price, an organization's street address, an organization's city, an organization's state, an organization's zip code, an organization's country, an organization's website address, an organization's purchases, an organization's orders, and the dates of an organization's orders. Examples of fields for account records, contact records, lead records, and/or opportunity records also include an employee's job title, an employee's first name, an employee's last name, an employee's e-mail address, an employee's telephone number, an employee's mobile phone number, an employee's fax number, and activity notes.

An index can be a data structure that stores at least one selected column or field of a database table, which enables data to be quickly located without requiring a search of every row in the database table until the requested data is located every time that the database table is accessed. However, using an index to access database tables comes at the cost of additional writes and storage space to maintain the index. An index normally includes a "key" or a direct link to at least a part of the original row of data from which the key was copied, which enables the complete row of data to be accessed efficiently. For example, Sales.Corp's Human Resources database uses an index, which includes a combination of each Sales.Corp employee's given name and family name that uniquely identifies each Sales.Corp employee, as the key for accessing the Sales.Corp Human Resources database, such that the index stores "Juan Hernandez" with a pointer to the Sales.Corp Human Resources database's location #999,999 for the record that stores Juan Hernandez's data.

For this example, if a Sales.Corp manager enters the name "Juan Hernandez" to request data for this employee, a database management system uses the name "Juan Hernandez" to reference the index, identify that the requested database record is stored at the database location #999,999, and searches the Sales.Corp Human Resources database for the database record for Juan Hernandez without having to read the first 999,998 records in the Sales.Corp Human Resources database. A key can be a value of a field or a column in a record that is used to lookup the record. A database system can use a specific choice of a minimal set of fields or columns which uniquely specify a row in an information table as a primary key which uniquely identifies a record. In some cases, a primary key may be a single field or column that stores a unique identifier, such as a national identification number for a database of people of a nation.

FIG. 1A depicts block diagrams illustrating a high-level overview 100 of traditional indexes for accessing database tables, and a database record 102. The database record 102 is a simplified example, as a database in a real-world production environment may include thousands of rows of records, and each record may include hundreds of columns of values, which would be far too large and complex for a clear depiction in the disclosed figures. A traditional database system creates indexes to enable performant accessing of the data stored in database tables. Indexes traditionally have a 1-to-1 mapping with the columns or fields in the database table. For example, the database record 102 includes a unique identifier field 104, an organization name field 106, a street address field 108, a city field 110, a state field 112, a zip code field 114, a country field 116, a website address field 118, an employee job title field 120, an employee first name field 122, an employee last name field 124, an employee e-mail address field 126, an employee telephone number field 128, and an activity notes field 130.

A traditional database system would create a different index for each of these different columns or fields 104-130 of the database record 102. Examples of such indexes include a unique identifier index 132, an organization name index 134, a street address index 136, a city index 138, a state index 140, a zip code index 142, a country index 144, a website address index 146, an employee job title index 148, an employee first name index 150, an employee last name index 152, an employee e-mail address index 154, an employee telephone number index 156, and an activity notes index 158. Although these indexes 132-158 include a key paired with a 3-digit hexadecimal value that lists the location of the record which includes the key, each key may be paired with any type of information that identifies the location of the key's corresponding record or information that identifies a pointer to such a location.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Figure 1A:
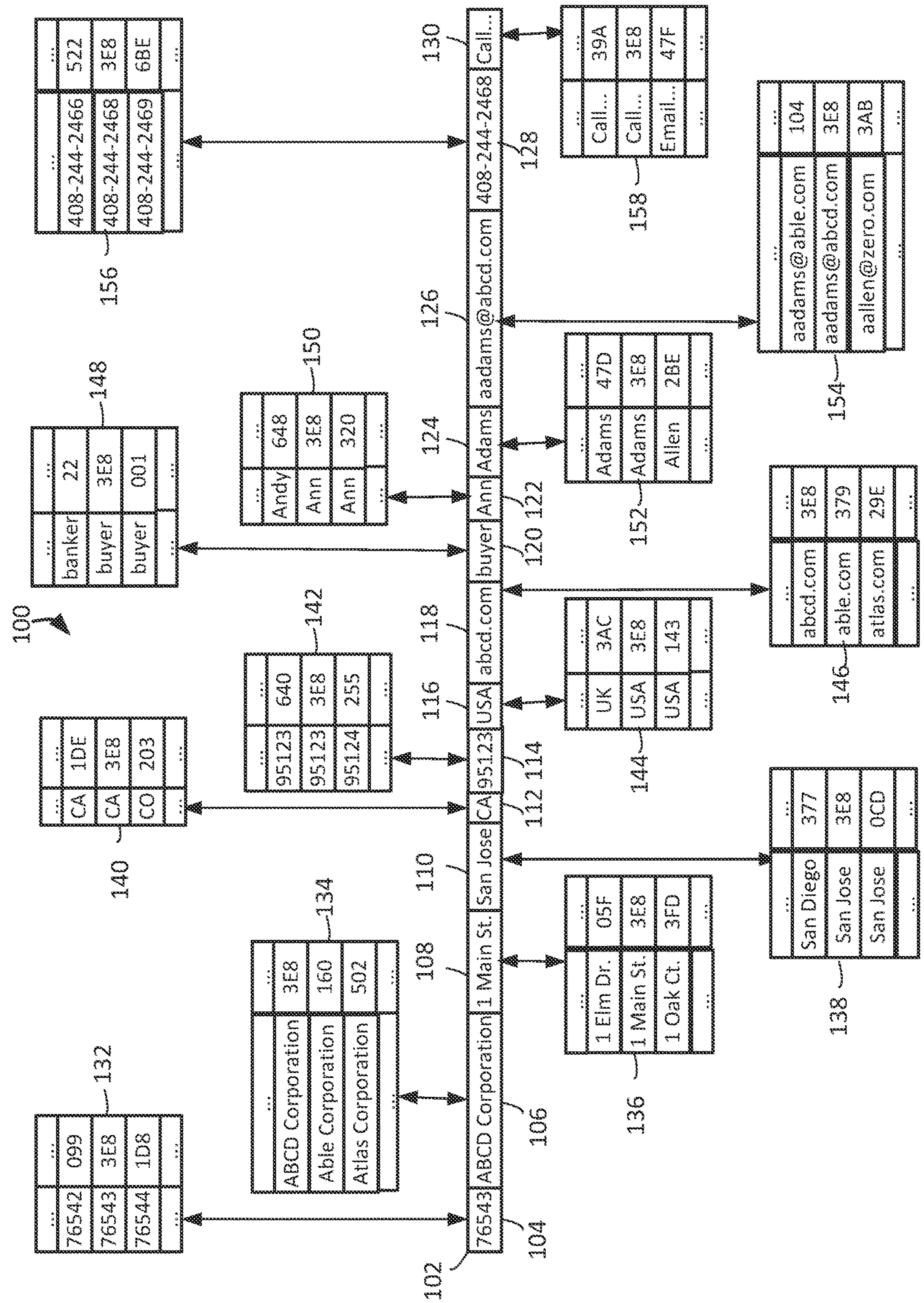
FIG. 1A illustrates block diagrams illustrating a high-level overview of traditional indexes for accessing database tables.

While the indexes 132-158 depicted in FIG. 1A can enable performance benefits while accessing data in database tables, traditional database systems require significant resources to store, access, and maintain such indexes 132-158. The creation of the corresponding indexes 132-158 for the fields 104-130 of the database record 102, with each field corresponding to a column of a database table, can result in a significantly large indexes 132-158 that require significant amounts of storage space. Consequently, traditional database systems may store these relatively large indexes 132-158 on disks, instead of in memory, which may not be optimal disk space utilization.

Furthermore, having to retrieve these relatively large indexes 132-158 from a relatively slow access device such as a disk may have an adverse impact of the total amount of time required by a traditional database system to access data which is indexed in such relatively large indexes 132-158. Additionally, when inserting each new record, such as the database record 102, into a database, a traditional database system can spend significant amounts of resources such as Central Processing Unit (CPU) utilization and time by individually inserting each value that is stored by each of the fields 104-130 into each of the corresponding indexes 132-158. Some database systems attempt to address such problems by using compression techniques to reduce the size of such relatively large indexes 132-158.

Figure 1B:
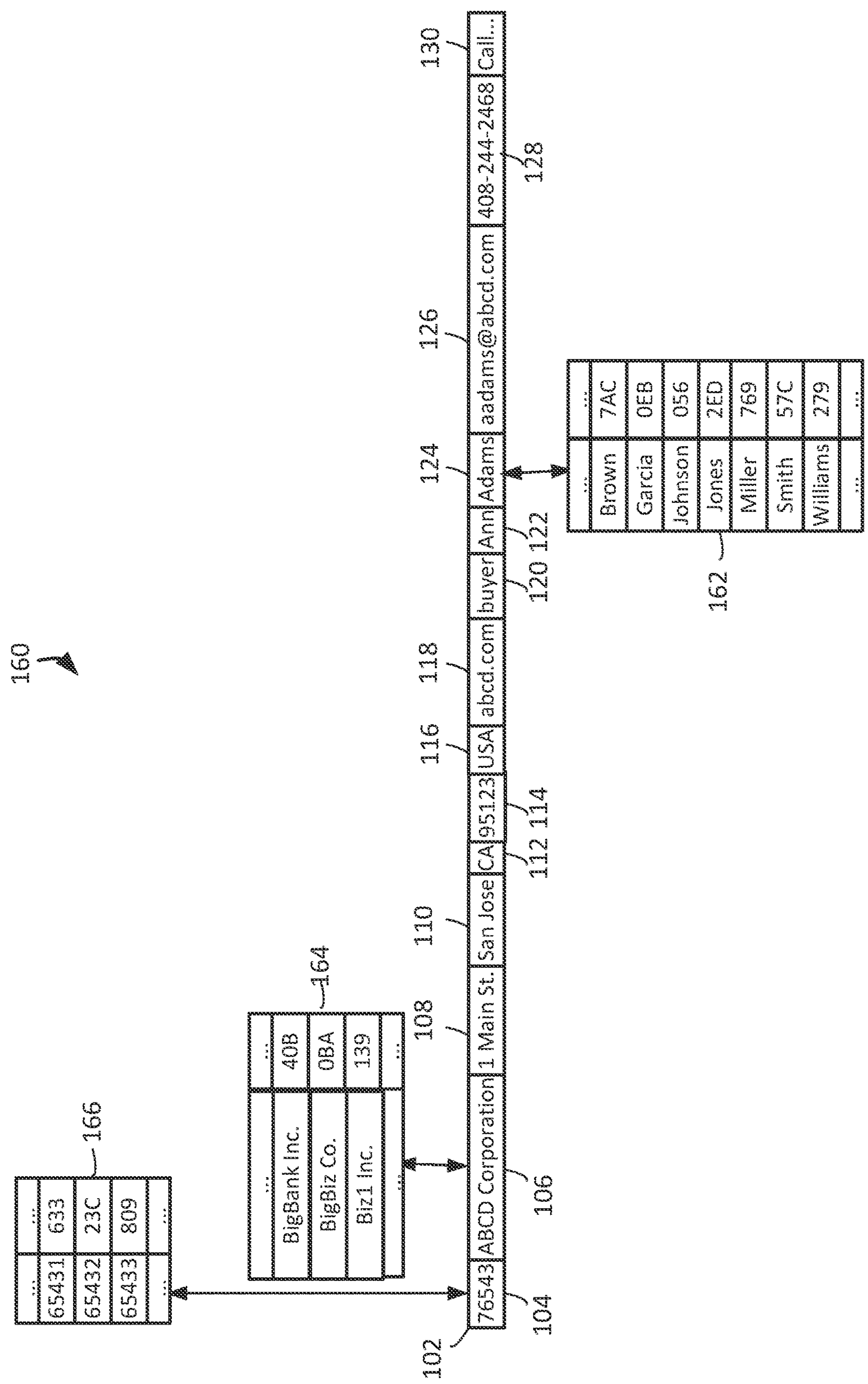
FIG. 1B illustrates block diagrams illustrating a high-level overview of optimized indexes for accessing database tables, in an embodiment.

FIG. 1B depicts block diagrams illustrating a high-level overview 160 of optimized indexes for accessing database tables, and the database record 102 depicted in FIG. 1A, in an embodiment. A database system executes data operations and tracks the more frequently accessed keys for the data operations to create the optimized indexes 162, 164, and 166 for accessing database tables. A frequently accessed key can be a value of a field or a column in a record that is often used to lookup the record. The subsequent examples of the database system creating the optimized indexes 162, 164, and 166 are based on the following types of data operations that Sales.Corp employees execute more frequently. An optimized index can be a data structure that stores at least one selected column or field of a database table, without storing all of the values that are stored in the selected column or field of the database table.

Sales.Corp sales representatives typically remember the last names of the contacts whom they often call, email, or text, so these representatives often enter a contact's last name into a query's employee last name field. Then these representatives review the query results which include the requested contact's phone number and/or email address and use the retrieved phone number and/or email address to communicate with the requested contact. Sales.Corp sales managers typically remember the organization names of the accounts that they supervise, so these managers often enter an account's organization name into a query's organization name field. Then these managers review the query results which include the requested account's activity notes and communicate with the account's Sales.Corp sales representatives if the requested account's activity notes raise any questions or concerns. Sales.Corp executive officers typically review their accounts home page that lists the organization names of Sales.Corp's most important sales accounts, so these officers often select an organization's name from a list of existing account organization names, which automatically enters the unique identifier for the selected account into a query's organization unique identifier field. Then these officers review the query results which include the requested account's activity notes, and then communicate with the account's Sales.Corp sales managers if the requested account's activity notes raise any questions or concerns.

In accordance with embodiments described herein, there are provided systems and methods for optimizing indexes for accessing database tables. A system executes a set of database operations and determines counts of instances that each key is specified for a corresponding column by any database operations on a database table. The system identifies each key which is associated with any determined count that satisfies a threshold as a corresponding frequently accessed key. The system creates an optimized index for each column which stores any frequently accessed key. The system inserts each frequently accessed key into a corresponding optimized index. The system receives a database operation that specifies a specific key for a specific column in the database table. If any optimized index matches the specific column and stores any frequently accessed key that matches the specific key, then the system references a matching frequently accessed key in a matching optimized index to access a record, which is associated with the specific column and the specific key, via the database table.

For this example, a database system executes Sales.Corp's training set of database operations, and a machine-learning model tracks how often Sales.Corp employees access each key in the Sales.Corp CRM database's fields. The machine-learning model determines that the more frequently accessed keys include the keys Brown, Garcia, Jones, Johnson, Miller, Smith, and Williams in the Sales.Corp CRM database's employee last name field, the keys BigBank Inc., BigBiz Co., and Biz1 Inc. in the Sales.Corp CRM database's organization name field, and the keys 65431, 65432, and 65433 in the Sales.Corp CRM database's organization unique identifier field. Therefore, the database system creates an optimized employee last name index and inserts the frequently accessed keys Brown, Garcia, Jones, Johnson, Miller, Smith, and Williams, creates an optimized organization name index, and inserts the frequently accessed keys BigBank Inc., BigBiz Co., and Biz1 Inc., creates an optimized organization unique identifier index and inserts the frequently accessed keys 65431, 65432, and 65433. Upon receiving a query for John in the employee first name column and Smith in the employee last name column, the database system determines that the query value Smith in the query-specified column for employee last name matches the key Smith which is stored in the optimized employee last name index 162, which matches the query-specified column for employee last name. Then the database system uses this optimized employee last name index 162 to identify the Sales.Corp CRM database's location 3E8 as storing a record that includes Smith in the last name field and accesses the Sales.Corp CRM database's record for John Smith more quickly than a traditional database system would have accessed the same record.

Systems and methods are provided for optimizing indexes for accessing database tables. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, methods and mechanisms for optimizing indexes for accessing database tables will be described with reference to example embodiments. The following detailed description will first describe a method for optimizing indexes for accessing database tables.

While one or more implementations and techniques are described with reference to an embodiment in which optimizing indexes for accessing database tables are implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The database system starts the process of optimizing indexes for accessing database tables by executing and tracking the execution of any number of historical sets of database operations and/or production sets of database operations to identify which keys in a database table's columns are more frequently accessed. A database operation can be a computer programming language instruction that creates (or inserts), reads (or selects), updates, or deletes information in an information structure. A historical set can be a group of elements that are associated with a past time. A production set can be a group of elements that are associated with a present time.

The database system can execute and track the execution of a historical set or a training set of data manipulation language operators, such as structured query language (SQL) statements and queries, that were executed in response to requests by Sales.Corp employees and previously recorded during any period of time, such as any number of hours, days, weeks, or months. For example, the database system executes and tracks the execution of last week's SQL queries which were executed in response to requests by Sales.Corp employees. After executing a training set of database operators to create the optimized indexes for accessing database tables, the database system can use the optimized indexes in a real-time on-line production environment to recalibrate the optimized indexes for accessing database tables. Such recalibrating can focus on the real-time on-line production environment's frequency of accessing each of the keys which narrowly qualified or narrowly missed qualifying for the database system's list of more frequently accessed keys during the execution of the historical or training set of database operations. For example, the database system executes an hour of today's SQL queries to confirm that Sales.Corp employees often enter the keys BigBank Inc., BigBiz Co., and Biz1 Inc. in the organization name index, because these keys narrowly qualified as some of the more frequently accessed keys during the execution of the training set of database operations.

After executing and tracking the execution of a training set of database operators and/or a production set of database operators to create optimized indexes for accessing database tables, the database system can use the optimized indexes in a real-time on-line production environment for an initial time period, which may be any number of hours, days, weeks, or months, or until the initial time period is ended by a system administrator or a machine-learning model. When the initial time period ends, the database system can retrain during a retraining time period, which may be any number of hours, days, weeks, or months, or until the retraining time period is ended by a system administrator or a machine-learning model, by executing and tracking the execution of a real-time on-line production set of database operations for the optimizing of the indexes for accessing database tables. For example, after 6 months of operation in a real-time on-line production environment, the database system executes and tracks the execution of today's SQL queries to determine that Sales.Corp employees still frequently enter the keys Brown, Garcia, Jones, Johnson, Miller, Smith, and Williams in the Sales.Corp CRM database's employee last name field, the keys BigBank Inc., BigBiz Co., and Biz1 Inc. in the Sales.Corp CRM database's organization name field, and indirectly enter the keys 65431, 65432, and 65433 in the Sales.Corp CRM database's organization unique identifier field.

Since the database system can train, recalibrate, and retrain the optimized indexes for accessing database tables, the database system can use a machine-learning model to initially train on a training set of database operations, recalibrate using a real-time on-line production set of database operators during a recalibrating time period, and then retrain using a real-time on-line production set of database operators during a retraining time period. A system administrator can be a person who manages the operation of one or more computers. A machine learning model can be a computer system that scientifically studies algorithms and/or statistical models to perform a specific task effectively by relying on patterns and inference instead of using explicit instructions.

While executing database operations, the database system identifies frequently accessed keys by counting the instances that each key is accessed in a database table's corresponding column by any database operations on the database table. For example, a machine-learning model counts the number of times that Sales.Corp's employees queried each key in the Sales.Corp CRM database's fields. When counting the instances that each key is accessed in a database table's corresponding column, the database system or the machine-learning models determines different counts for each column in a database table. For example, when the machine-learning model counts the number of instances that the key New York is queried in the city column of the Sales.Corp CRM database, this count is recorded separately of the number of instances that the key New York is queried in the state column of the Sales.Corp CRM database. Although these examples describe the counting of each instance that a key is queried in a database table's column, the database system and/or a machine-learning model can also count each instance that a key is used to write a value to a database table's column, insert a record in a database table, or delete a record from a database table.

The database system and/or the machine-learning model can use raw counts or calculate adjusted frequencies that each key is accessed in a corresponding column, such as 7 total instances that the key Bank1 Co. was queried in the Sales.Corp CRM database's organization name field during the last week, or a daily average of 1.0 instances that the key Bank1 Co. was queried in the Sales.Corp CRM database's organization name field during the last 7 days. A count can be an arithmetical value, expressed by a word, symbol, or figure, representing a particular quantity, which may be used in making calculations. An instance can be a single occurrence of something.

After or during the counting of accesses for each key in a database table's columns, the database system or a machine-learning model identifies each key's access count that meets or exceeds a threshold for the more frequently accessed keys in any one database table column. For example, the machine-learning model determines the key access counts of 31 for Brown, 23 for Garcia, 29 for Jones, 41 for Johnson, 19 for Miller, 43 for Smith, and 37 for Williams in the Sales.Corp CRM database's employee last name field, the key access counts of 13 for BigBank Inc., 17 for BigBiz Co., and 11 for Biz1 Inc. in the Sales.Corp CRM database's organization name field, and the key access counts of 22 for 65431, 24 for 65432, and 20 for 65433 in the Sales.Corp CRM database's organization unique identifier field. Since each of these key access counts exceed the threshold of 7 key access counts during a 7-day period, the corresponding keys therefore qualify as some of the more frequently accessed keys. A threshold can be the magnitude or intensity that must be met or exceeded for a certain reaction, phenomenon, result, or condition to occur or be manifested.

Determining a count of accesses for every key of every record can require hundreds of thousands of counters to track hundreds of keys for each of thousands of records. Rather than repeatedly referring back to the hundreds of thousands of counters of accesses for each key in a database table's columns, the database system may list each key that qualifies as a frequently accessed keys in a list of frequently accessed keys and their database table columns, which may be referred to as a heat map or a list of frequently accessed entities. A heat map has traditionally been defined as a data visualization technique that displays the magnitude of a phenomenon as varying colors in two dimensions, with the variation in color providing obvious visual cues to a human viewer about how the phenomenon is clustered or varies over space. Since as many as 95% of the hundreds of thousands counters store numbers of accesses for keys which are not used, this embodiment's heat map may efficiently list the identifiers of only the relatively few keys that were accessed more frequently than a threshold value, and only the relatively few database table columns that store these relatively few frequently accessed keys.

Following the identification of the more frequently accessed keys, whose access counts exceed a threshold, the database system creates optimized indexes by initially creating a new index for each column which stores any of the more frequently accessed keys. However, the database system creates these optimized indexes only for the keys which were identified as some of the more frequently accessed keys in the specific database table columns in which they were more frequently accessed. For example, the database system references the heat map/list of frequently accessed entities to identify which traditional indexes stored the keys that were more frequently accessed. Then the database system uses these identified indexes to create the optimized employee last name index 162 for inserting the frequently accessed keys Brown, Garcia, Jones, Johnson, Miller, Smith, and Williams, creates the optimized organization name index 164 for inserting the frequently accessed keys BigBank Inc., BigBiz Co., and Biz1 Inc., and creates the optimized organization unique identifier index 166 for inserting the frequently accessed keys 65431, 65432, and 65433.

Having created new indexes, the database system inserts the more frequently accessed keys into the corresponding newly created optimized indexes. For example, the database system references the heat map/list of frequently accessed entities to identify the frequently accessed keys and the indexes that stored the frequently accessed keys. Then the database system uses the identified frequently accessed keys and the identified indexes in the heat map/list of frequently accessed entities to insert the frequently accessed keys Brown, Garcia, Jones, Johnson, Miller, Smith, and Williams in the optimized employee last name index 162, insert the frequently accessed keys BigBank Inc., BigBiz Co., and Biz1 Inc. in the optimized organization name index 164, and insert the frequently accessed keys 65431, 65432, and 65433 in the optimized organization unique identifier index 166.

An administrative user and/or by a machine-learning model may set a threshold to determine the relative size and/or the relative performance of the optimized indexes. The system administrator may directly set the threshold, or indirectly set the threshold by instructing the machine-learning model to set a threshold, to balance the interests between optimized storage size, which could be accomplished by using a relatively high threshold, and the interests of optimized performance, which could be accomplished by using a relatively low threshold. For example, a system administrator can configure the identification of the number of frequently accessed keys, which will be stored in optimized indexes, to be only 5 percent of the keys that would have been stored in traditional indexes, which are the 5 percent of the keys that are the most frequently accessed keys. For this example, which is based on thousands of database records, each of which store values in hundreds of database fields, a traditional database system would require the storage of hundreds of thousands of keys for these database records, and a system administrator can set the threshold to 5 percent of the most frequently accessed keys, which results in setting the relative size of the optimized indexes to 5 percent of the size of the traditional indexes. Therefore, during the execution of the database operations, the database system will identify more than 5 thousand keys (5 percent of hundreds of thousands of keys) that were the most frequently accessed keys by the executed database operations.

In an alternative example, a system administrator can configure the identification of the number of frequently accessed keys, which will be stored in optimized indexes, to be only 10 percent of the keys that would have been stored in traditional indexes, which are the 10 percent of the keys which are the most frequently accessed keys. For this example, which is based on thousands of database records, each of which store values in hundreds of database fields, a traditional database system would require the storage of hundreds of thousands of keys for these database records, and a system administrator can set the threshold to 10 percent of the most frequently accessed keys, which results in setting the relative size of the optimized indexes to 10 percent of the size of the traditional indexes. Therefore, during the execution of the database operations, the database system will identify mote than ten thousand keys (ten percent of hundreds of thousands of keys) that were the most frequently accessed keys by the executed database operations.

The 10 percent threshold would result in optimizing the accessing of database records for twice as many frequently accessed keys as the 5 percent threshold would result in optimizing the accessing of database records. In contrast, the 5 percent threshold would result in optimizing indexes that are half the size of the size of the indexes that the 10 percent threshold would result in optimizing. Consequently, a system administrator could select a 7 percent threshold that balances the storage space considerations and the access performance considerations of the 5 percent threshold and the 10 percent threshold. Alternatively, a system administrator could select a greater than 10 percent threshold if the access performance required is more than the access performance produced by using the 10 percent threshold, or select a less than 5 percent threshold if the combined sizes required for the optimized indexes is less than the optimized index sizes produced by using the 5 percent threshold, Alternatively, a machine-learning model may determine how many frequently accessed keys to store in optimized indexes by determining metrics for traditional database indexes and for optimized indexes and determining whether the metrics indicate the need to create new optimized indexes to improve the performance of accessing database tables and/or delete existing optimized indexes to reduce the space required for storing optimized indexes. Then the database system can create new optimized indexes and/or delete existing optimized indexes as needed, determine metrics for the new optimized indexes, and repeat this threshold determination process as necessary and/or on a periodic basis to ensure that the optimized indexes remain optimized. The machine-learning model may determine metrics based on how many keys are stored in traditional indexes by a traditional database system, how much storage space is required for storing the traditional indexes, the execution times for database operations that use the traditional indexes, and the CPU utilization and time required for inserting and deleting traditional keys from the traditional indexes. Similarly, the machine-learning model may determine metrics based on how many frequently accessed keys would be or are stored in optimized indexes by the disclosed database system, how much storage space would be or is required for storing the optimized indexes, the execution times for database operations that would or do use the optimized indexes, the execution times for database operations that would not use or do not use the optimized indexes, and the CPU utilization and time that would be or is required for inserting and deleting only the frequently accessed keys only in the optimized indexes.

Then the machine-learning model can determine weights for each of these metrics and combine these weights with these metrics to determine the optimal number of frequently accessed keys to store in the optimal number of indexes and determine whether the optimal number of frequently accessed keys requires the creation of any new optimized indexes, the deletion of any existing optimized indexes, and the insertion and/or the deletion of any frequently accessed keys in the optimized indexes. Alternatively, or additionally, the machine-learning model can use such weights as are assigned by system administrators or obtained from other sources. In a general example which does not include the use of the weights or the weighted metrics, the machine-learning model determines that during the execution of the real-time online production set of database operations, the last name Davis was queried on average 0.9 instances each day, which was not frequently enough to exceed the threshold of 1.0 to be qualified as a frequently accessed key. However, the somewhat frequent querying of the key Davis in the Sales.Corp CRM database's employee last name column 0.9 instances each day during the last week resulted in a daily average of 0.9 sequential accesses of the Sales.Corp CRM database during the last week, which collectively were the largest grouped consumption of resources for CPU utilization and time. Therefore, the machine-learning model can reduce CPU utilization and time by reducing the threshold to 0.8, and then inserting the key Davis in the employee last name index 162. The machine-learning model can output the revised threshold with a corresponding explanation to a system administrator, who may approve, reject, or change the machine-learning model's revised threshold.

By limiting the number of indexes and the number of keys stored by these limited number of indexes, the database system now requires significantly less space to store these significantly smaller indexes, which may require less than 5 percent of the storage space that would have been required to store traditional indexes for accessing the same database table. The optimized and significantly smaller indexes not only require less storage space, which may result in much quicker retrieval of these smaller indexes from disk, but also may require such a small amount of storage space as to enable at least part of the optimized indexes to be retained in memory, which can result in even quicker accessing of data by using these smaller indexes which remain in memory.

Furthermore, when inserting a new record into a database table, rather than inserting a key into an index for every key in every column in the new record, the database system inserts a key into an index for only a limited number of keys in only a limited number of columns in the new record. Such insertions are limited to keys in the new records that match the limited number of keys stored in the limited number of indexes. For example, FIG. 1A illustrates that a traditional database system would accompany the adding of the new database record 102 with the inserting of hundreds of keys (14 keys depicted) for hundreds of database record fields (14 database record fields 104-130 depicted) in hundreds of indexes (14 indexes 132-158 depicted), with each of the hundreds of indexes (14 indexes 132-158 depicted) storing more than thousands of keys, which would result in the maintenance of hundreds of thousands of keys (hundreds of fields multiplied by thousands of records). In contrast, FIG. 1B illustrates that the disclosed database system would accompany the adding of the new database record 102 by inserting 3 keys for the 3 database record fields 104, 106, and 124 to the 3 optimized indexes 162-166, which store 7, 3, and 3 keys, respectively, and collectively store only 13 keys. Although this example reduction of the total number of keys stored from hundreds of thousands of keys (hundreds of columns multiplied by thousands of rows) to 13 keys may not be achievable in most real-world production environments, a reduction of 95 percent of the keys stored in indexes may be achieved in many real-world production environments.

In these simplified examples, the more frequently accessed keys in the optimized organization unique identifier index 166 are in the range of the 3 consecutively numbered keys 65431, 65432, and 65433. However, in a real-world production environment example of a database that stores more than thousands of records, the 5 percent of the keys which qualify as the more frequently accessed keys may include larger ranges of consecutively ordered keys. A database system could identify the range of the 5 consecutively numbered keys 12341, 12342, 12343, 12344, and 12345 by listing the 5 elements 12341, 12342, 12343, 12344, and 12345 in the heat map/list of frequently accessed entities, or by listing fewer elements, such as the 3 elements 12341-12345 in the heat map/list of frequently accessed entities, which would reduce the storage space required for the heat map/list of frequently accessed entities. The reduction of 5 elements to 3 elements in the heat map/list of frequently accessed entities may not appear to be significant in this simplified example. However, in a real-world production environment for which the database system stores more than thousands of records, each of which stores more than hundreds of keys, the optimized indexes which store only 5 percent of the more frequently accessed keys would still store more than 5 thousand keys, such that the database system could significantly reduce the required storage space for the heat map/list of frequently accessed entities by reducing large ranges of consecutively ordered keys which are identified in the heat map/list of frequently accessed entities.

Furthermore, a system administrator may instruct the database system to fill in, or leverage a machine-learning model that learns to fill in, relatively small gaps in relatively large ranges of consecutively ordered keys which are listed in the heat map/list of frequently accessed entities. For example, instead of listing the 9 elements 12341-12343, 12345-12347, and 12349-12351 in the heat map/list of frequently accessed entities to identify 3 closely numbered ranges of consecutively numbered keys, the database system could list the 3 elements 12341-12351 in the heat map/list of frequently accessed entities, which could reduce the required storage space for the heat map/list of frequently accessed entities by simply listing elements in the heat map/list of frequently accessed entities which correspond to the less frequently accessed keys 12344 and 12348.

After creating optimized indexes, the database system receives a database operation which specifies a specific column storing a specific key in a database's table and which may be able to use optimized indexes to access the data in the database's table. For example, the database system receives a query of John for the employee first name column and Smith for the employee last name column.

Following receipt of a new database operation that specifies a specific key for a specific column in the database table, the database system determines whether to use optimized indexes to access any records for the newly received database operation. The database system makes this determination based on whether any optimized index matches the database operation's specific column and stores any frequently accessed key that matches the database operation's specific key. For example, the database system determines whether the query values John or Smith match any of the more frequently accessed keys stored in any of the optimized indexes that match the query-specified columns.

Figure 2:
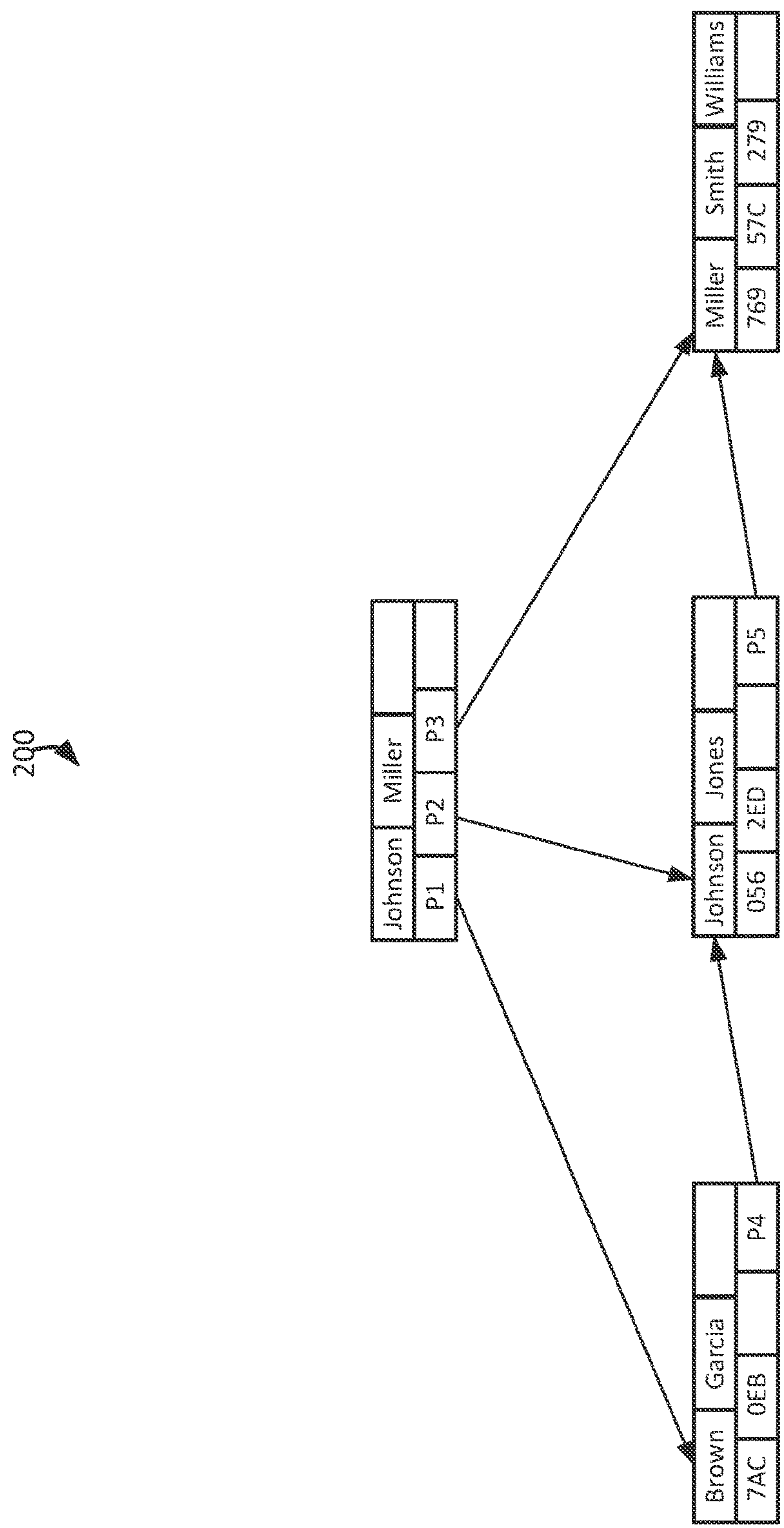
FIG. 2 illustrates an example of a b-tree data structure used for optimizing indexes for accessing database tables, in an embodiment.

FIG. 2 depicts a simplified example of a b-tree data structure 200 that a database system can create based on the example employee last name field values. The database system can execute database operations faster by using an optimized and substantially quicker path with less overhead for frequently accessed keys. For example, FIG. 2 depicts that the database system accesses substantially smaller leaf and node blocks to traverse through the optimized index and access the corresponding row of the database's table, which can drastically improve the database operations' performance and yet still provide the performance benefits of traditional indices. For example, FIG. 1A illustrates that a traditional database system would have to traverse as many as thousands of keys in the index 152 for last names to determine whether the key for a last name is already stored as an existing key in the index 152.

In contrast, FIG. 1B illustrates that the disclosed database system would have to traverse only as many as 7 keys in the optimized index 162 for last names to determine whether the key for a last name is already stored as an existing key in the optimized index 162. The b-tree 200 depicted by FIG. 2 illustrates that when the disclosed database system accesses the key for the last name Smith, the highest alphabetical order key in the root node is for the last name Miller, which directs the disclosed database system to the rightmost sub-tree, which stores the keys for the names Miller, Smith, and Williams. Since the disclosed database system has already determined that the key for the last name Smith is greater in alphabetical order than the key for the last name Miller in the root node, the disclosed database system could begin the search of the rightmost sub-tree at the second key, which stores the last name Smith that matches the key Smith. Although this example describes the use of a tree, specifically a b-tree, as a data structure that can implement an optimized index for accessing database tables, other data structures could be used in alternative embodiments, such as data structures based on hashes, hash tables, matrixes, and bit maps.

If any optimized index matches the recently received database operation's specified columns and stores any frequently accessed keys that matches the recently received database operation's specified key(s), the database system uses the optimized indexes to access records for the recently received database operation. The database system uses a matching frequently accessed key in a matching optimized index to access any records in the database table which are associated with the recently received database operation's specified column and the recently received database operation's specified key. For example, the database system determines that the query value Smith matches the frequently accessed key for the last name Smith which is stored in the optimized employee last name index 162 that matches the query-specified column for last names, and then uses this optimized index 162 to identify the Sales.Corp CRM database's location 3E8 which stores a record that includes Smith in the last name field. This use of an optimized index results in accessing the Sales.Corp CRM database's record for John Smith more quickly than a traditional database system would have accessed the same record.

If no optimized index matches the new database operation's specified column or stores any frequently accessed key that matches the new database operation's specified key(s), then the database system can access the database table records for the new database operation without using any optimized indexes. For example, the database system determines that a new query's value of the last name Rodriguez is not stored in the optimized employee last name index 162, and then sequentially searches the Sales.Corp CRM database for records which store the infrequently accessed last name Rodriguez. Such a sequential search of a database table is relatively slower than a search using a traditional index. However, such sequential searches are conducted only for infrequently accessed keys, and the affects of infrequent sequential searches are more than offset by the quicker searches using optimized indexes when combined with the reduction of overhead due to no longer needing to insert every key for every column for every new record inserted in the database, as well as to no longer needing to delete every key for every column for every record that is deleted from the database.

Recalibrating a machine-learning model that has been trained on a training set of data operations may result in the creation of new optimized indexes for accessing database tables, rather than the modification of any already existing optimized indexes for accessing database tables. In contrast, retraining the machine-learning model on a production set of data operations may result in the modification or deletion of any already existing optimized indexes for accessing database tables, as well as the creation of new optimized indexes for accessing database tables. For example, retraining a machine-learning model may result in identifying an additional frequently accessed key which is associated with any determined count that satisfies the threshold, creating an optimized index for the corresponding column which stores the additional frequently accessed key if no optimized index has already been created for the corresponding column which stores the additional frequently accessed key; and inserting the additional frequently accessed key into any corresponding optimized index. For example, during retraining the database system determines that the key Martinez was accessed at a daily average of 1.2 instances in the Sales.Corp CRM database's employee last name column over the last week, which is greater than the threshold of 1.0.

Then the database system determines if an optimized index has already been created for the last name column. If an optimized index has not already been created for the last name column, the database system creates a new optimized index for the last name column. Then the database system inserts the frequently accessed key for the last name Martinez into the already existing or newly created optimized index for the last name column.

Retraining the machine-learning model on a production set of data operations can result in identifying a frequently accessed key which was associated with any historical determined count that historically satisfied a historical threshold and which is associated with any current determined count that currently fails to satisfy a current threshold. For example, during retraining the database system determines that the previously frequently accessed key Biz1 Inc. was accessed at a daily average of 0.9 instances in the Sales.Corp CRM database's organization name column over the last week, which is less than the threshold of 1.0. Next the machine-learning model determines whether an optimized index that was created for a corresponding column which stores the previously frequently accessed key also stores any other frequently accessed keys, and then deletes the optimized index for the corresponding column which stores the previously frequently accessed key if the optimized index that was created for the corresponding column which stores the previously frequently accessed key does not store any other frequently accessed keys. For example, if the optimized index for the organization name column 164 stored only the previously frequently accessed key Biz1 Inc., then the machine-learning model would delete the optimized index for the organization name column because the deletion of the previously frequently accessed key Biz1 Inc. would result in an empty optimized index for the organization name column 164.

The machine-learning model can also delete the previously frequently accessed key from an optimized index if the optimized index that was created for the corresponding column which stores the previously frequently accessed key also stores any other frequently accessed key. For example, since the optimized index for the organization name column 164 stores frequently accessed keys other than the previously frequently accessed key for Biz1 Inc., then the machine-learning model would delete only the previously frequently accessed key Biz1 Inc. from the optimized index for the organization name column 164 because the deletion of the previously frequently accessed key Biz1 Inc. would result in an optimized index for the organization name column 164 that continues to store frequently accessed keys.

A historical count can be a previous arithmetical value, expressed by a word, symbol, or figure, which represented a particular quantity, which may have been used in making calculations. A historical threshold can be the previous magnitude or intensity that must have been met or exceeded for a certain reaction, phenomenon, result, or condition to have occurred or have been manifested. A current count can be an arithmetical value, expressed by a word, symbol, or figure, which presently represents a particular quantity, which may be presently used in making calculations. A current threshold can be the present time's magnitude or intensity that must be met or exceeded for a certain reaction, phenomenon, result, or condition to occur or be manifested.

Figure 3:
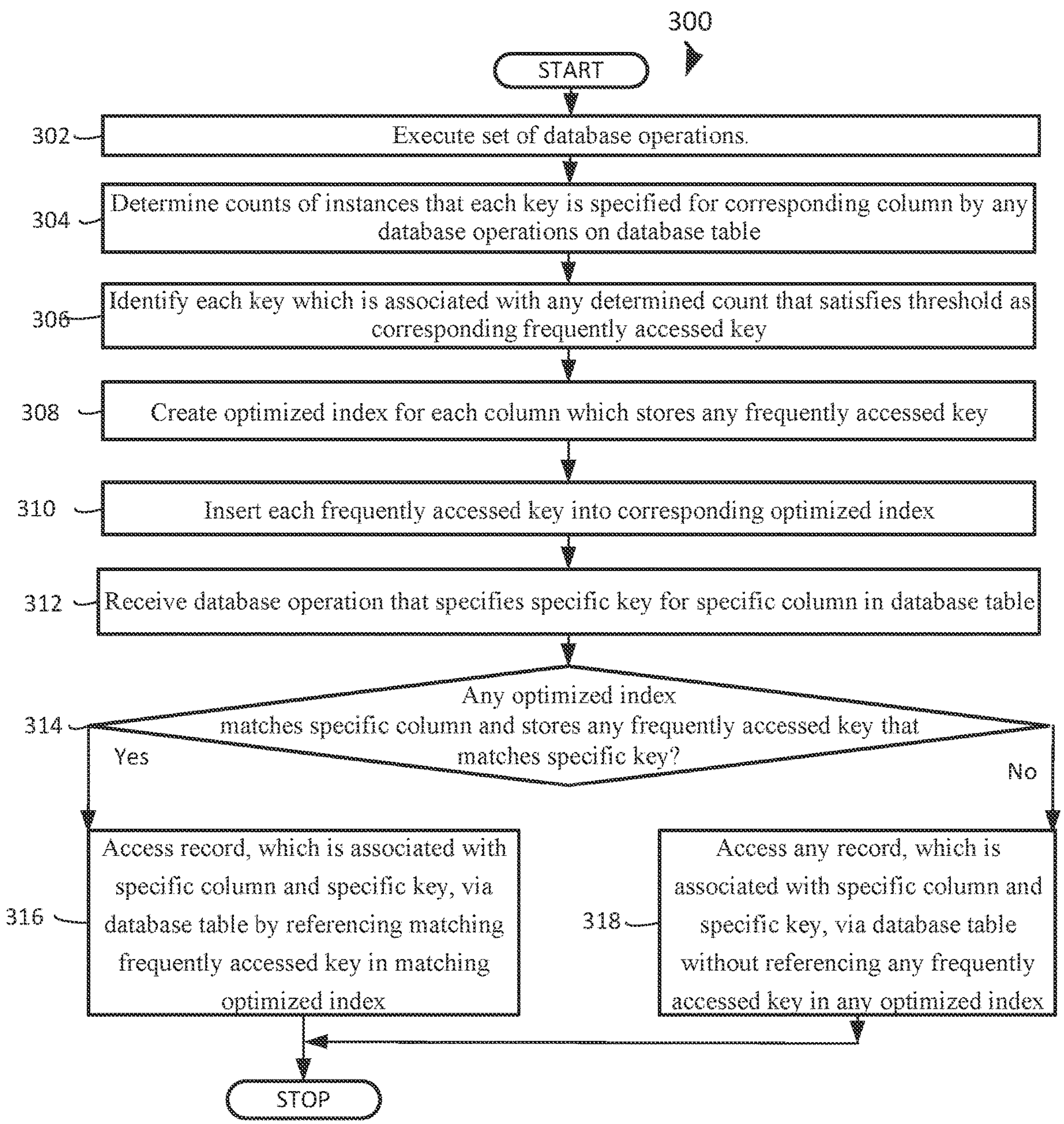
FIG. 3 is an operational flow diagram illustrating a high-level overview of a method for optimizing indexes for accessing database tables, in an embodiment.

FIG. 3 is an operational flow diagram illustrating a high-level overview of a method 300 for optimizing indexes for accessing database tables. A set of database operations is executed, block 302. The system can train on a training set of database operations, recalibrate, and/or retrain on a production set of database operations to optimize indexes for accessing database tables. For example, and without limitation, this can include the database system executing Sales.Corp's training set of database operations.

While executing database operations, counts are determined of instances that each key is specified for a corresponding column by any database operations on a database table, block 304. The system counts the instances that each key is accessed in a database table's corresponding columns by database operations. By way of example and without limitation, this can include a machine-learning model tracking how often Sales.Corp's employees directly or indirectly queried each key in the Sales.Corp CRM database's fields.

After or during the counting of accesses for each key in a database table's corresponding columns, each key is identified which is associated with any determined count that satisfies a threshold as a corresponding frequently accessed key, block 306. The system identifies the frequently accessed keys in a database table's corresponding columns. In embodiments, this can include the machine-learning model determining that some of the more frequently accessed keys include the keys Brown, Garcia, Jones, Johnson, Miller, Smith, and Williams in the Sales.Corp CRM database's employee last name field, the keys BigBank Inc., BigBiz Co., and Biz1 Inc. in the Sales.Corp CRM database's organization name field, and the keys 65431, 65432, and 65433 in the Sales.Corp CRM database's organization unique identifier field. Then the database system lists each key that qualifies as a frequently accessed keys in the heat map/list of frequently accessed entities.

Following the identification of keys whose access counts exceed a threshold, an optimized index is created for each column which stores any frequently accessed key, block 308. The system creates new indexes for the more frequently accessed keys. For example, and without limitation, this can include the database system referencing the heat map/list of frequently accessed entities to identify which traditional indexes stored the keys that were more frequently accessed. Then the database system uses these identified indexes to create the optimized employee last name index 162 for inserting the frequently accessed keys Brown, Garcia, Jones, Johnson, Miller, Smith, and Williams, creates the optimized organization name index 164 for inserting the frequently accessed keys BigBank Inc., BigBiz Co., and Biz1 Inc., and creates the optimized organization unique identifier index 166 for inserting the frequently accessed keys 65431, 65432, and 65433.

Having created optimized indexes, each frequently accessed key is inserted into a corresponding optimized index, block 310. The system inserts the frequently accessed keys into the newly created optimized indexes. By way of example and without limitation, this can include the database system referencing the heat map/list of frequently accessed entities to identify the frequently accessed keys and the indexes that stored the frequently accessed keys. Then the database system uses the identified frequently accessed keys and the identified indexes in the heat map/list of frequently accessed entities to insert the frequently accessed keys Brown, Garcia, Jones, Johnson, Miller, Smith, and Williams in the optimized employee last name index 162, insert the frequently accessed keys BigBank Inc., BigBiz Co., and Biz1 Inc. in the optimized organization name index 164, and insert the frequently accessed keys 65431, 65432, and 65433 in the optimized organization unique identifier index 166.

After creating optimized indexes, a database operation is received that specifies a specific key for a specific column in a database table, block 312. The system receives a database operation which may be able to use the optimized indexes to access a database table. In embodiments, this can include the database system receiving a query of John for the employee first name column and Smith for the employee last name column.

Following receipt of a new database operation that specifies a specific key for a specific column in a database table, a determination is made whether any optimized index matches the specific column and stores any frequently accessed key that matches the specific key, block 314. The system determines whether to use the optimized indexes to access any records for the newly received database operation. For example, and without limitation, this can include the database system determining whether the query values John or Smith match any keys stored in any optimized indexes that match the query-specified columns. If any optimized index matches the specific column and stores any frequently accessed key that matches the specific key, the method 300 continues to block 316 to use the optimized index to access any records for the new database operation. If no optimized index matches the specific column or stores any frequently accessed key that matches the specific key, the method proceeds to block 318 to access any records for the new database operation without the use of any optimized indexes.

If any optimized index matches the specific column and stores any frequently accessed key that matches the specific key, then a matching frequently accessed key in a matching optimized index is referenced to access a record, which is associated with the specific column and the specific key, via the database table, block 316. The system uses optimized indexes to access records for the new database operation. By way of example and without limitation, this can include the database system determining that a query value matches the last name Smith which is stored in the optimized employee last name index 162 that matches the query-specified column, and then using this optimized index 162 to identify the Sales.Corp CRM database's location 3E8 which stores a record that includes Smith in the last name field. This use of an optimized index results in accessing the Sales.Corp CRM database's record for John Smith more quickly than a traditional database system would have accessed the same record.

If no optimized index matches the specific column or stores any frequently accessed key that matches the specific key, then no frequently accessed key in any optimized index is referenced to access any record which is associated with the specific column and the specific key, via the database table, block 318. The system can access records for the new database operation without using any optimized indexes. In embodiments, this can include the database system determining that the query value for the last name Rodriguez is not stored in the optimized employee last name index 162, and then sequentially searching the Sales.Corp CRM database for records which store the infrequently accessed last name Rodriguez.

The method 300 may be repeated as desired. Although this disclosure describes the blocks 302-318 executing in a particular order, the blocks 302-318 may be executed in a different order. In other implementations, each of the blocks 302-318 may also be executed in combination with other blocks and/or some blocks may be divided into a different set of blocks.

System Overview

Figure 4:
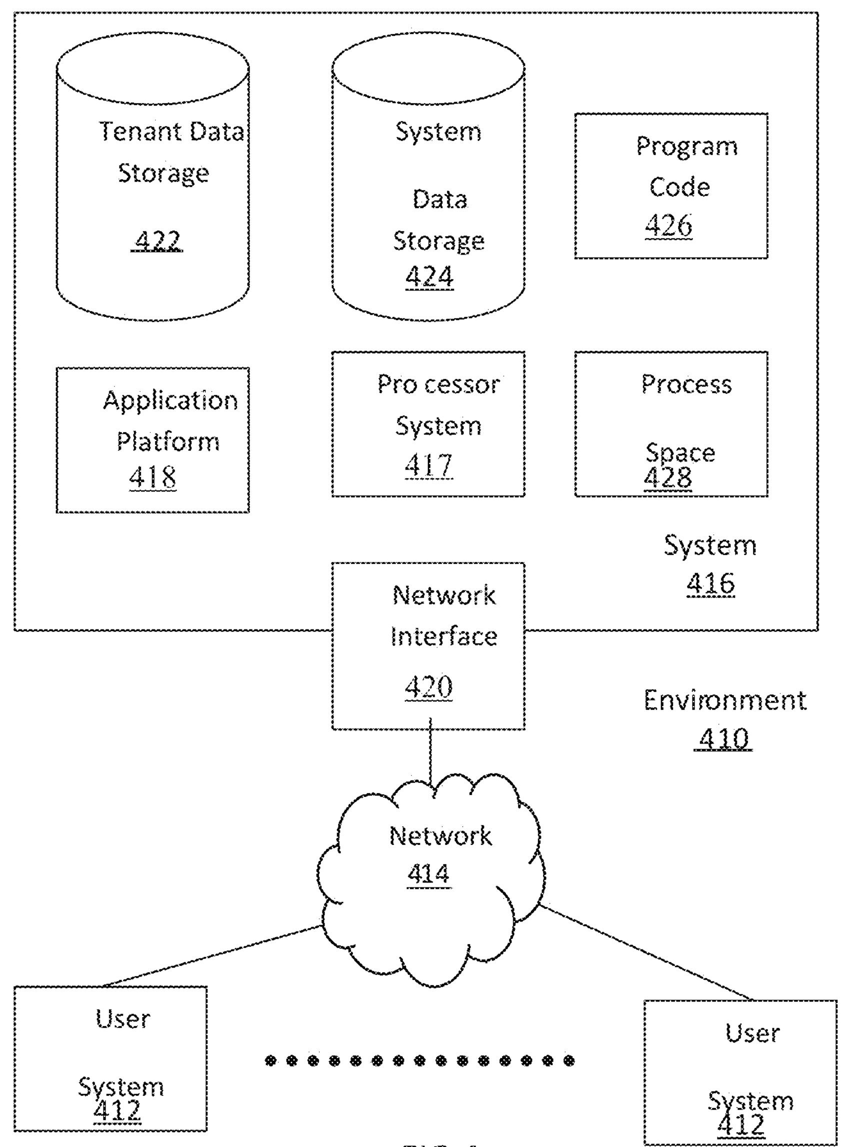
FIG. 4 illustrates a block diagram of an example of an environment wherein an on-demand database service might be used.

FIG. 4 illustrates a block diagram of an environment 410 wherein an on-demand database service might be used. The environment 410 may include user systems 412, a network 414, a system 416, a processor system 417, an application platform 418, a network interface 420, a tenant data storage 422, a system data storage 424, program code 426, and a process space 428. In other embodiments, the environment 410 may not have all of the components listed and/or may have other elements instead of, or in addition to, those listed above.

The environment 410 is an environment in which an on-demand database service exists. A user system 412 may be any machine or system that is used by a user to access a database user system. For example, any of the user systems 412 may be a handheld computing device, a mobile phone, a laptop computer, a workstation, and/or a network of computing devices. As illustrated in FIG. 4 (and in more detail in FIG. 5) the user systems 412 might interact via the network 414 with an on-demand database service, which is the system 416.

An on-demand database service, such as the system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 416" and the "system 416" will be used interchangeably herein. A database image may include one or more database objects.

A relational database management system (RDMS) or the equivalent may execute storage and retrieval of information against the database object(s). The application platform 418 may be a framework that allows the applications of the system 416 to run, such as the hardware and/or software, e.g., the operating system. In an embodiment, the on-demand database service 416 may include the application platform 418 which enables creation, managing and executing one or more applications developed by the provider of the on-demand database service, users accessing the on-demand database service via user systems 412-, or third-party application developers accessing the on-demand database service via the user systems 412.

The users of the user systems 412 may differ in their respective capacities, and the capacity of a particular user system 412 might be entirely determined by permissions (permission levels) for the current user. For example, where a salesperson is using a particular user system 412 to interact with the system 416, that user system 412 has the capacities allotted to that salesperson. However, while an administrator is using that user system 412 to interact with the system 416, that user system 412 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 414 is any network or combination of networks of devices that communicate with one another. For example, the network 414 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 412 might communicate with the system 416 using TCP/IP and, at a higher network level, use other common Internet protocols to communicate, such as HTTP, FTP, AFS, WAP, etc. In an example where HTTP is used, the user systems 412 might include an HTTP client commonly referred to as a "browser" for sending and receiving HTTP messages to and from an HTTP server at the system 416. Such an HTTP server might be implemented as the sole network interface between the system 416 and the network 414, but other techniques might be used as well or instead. In some implementations, the interface between the system 416 and the network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 416, shown in FIG. 4, implements a web-based customer relationship management (CRM) system. For example, in one embodiment, the system 416 includes application servers configured to implement and execute CRM software applications as well as provide related data, code, forms, webpages and other information to and from the user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared.

In certain embodiments, the system 416 implements applications other than, or in addition to, a CRM application. For example, the system 416 may provide tenant access to multiple hosted (standard and custom) applications, including a CRM application. User (or third-party developer) applications, which may or may not include CRM, may be supported by the application platform 418, which manages creation, storage of the applications into one or more database objects and executing of the applications in a virtual machine in the process space of the system 416.

One arrangement for elements of the system 416 is shown in FIG. 4, including the network interface 420, the application platform 418, the tenant data storage 422 for tenant data 423, the system data storage 424 for system data 425 accessible to the system 416 and possibly multiple tenants, the program code 426 for implementing various functions of the system 416, and the process space 428 for executing MTS system processes and tenant-specific processes, such as running applications as part of an application hosting service. Additional processes that may execute on the system 416 include database indexing processes.

Several elements in the system shown in FIG. 4 include conventional, well-known elements that are explained only briefly here. For example, each of the user systems 412 could include a desktop personal computer, workstation, laptop, PDA, cell phone, or any wireless access protocol (WAP) enabled device or any other computing device capable of interfacing directly or indirectly to the Internet or other network connection. Each of the user systems 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 412 to access, process and view information, pages and applications available to it from the system 416 over the network 414.

Each of the user systems 412 also typically includes one or more user interface devices, such as a keyboard, a mouse, trackball, touch pad, touch screen, pen, or the like, for interacting with a graphical user interface (GUI) provided by the browser on a display (e.g., a monitor screen, LCD display, etc.) in conjunction with pages, forms, applications, and other information provided by the system 416 or other systems or servers. For example, the user interface device may be used to access data and applications hosted by the system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks may be used instead of the Internet, such as an intranet, an extranet, a virtual private network (VPN), a non-TCP/IP based network, any LAN or WAN or the like.

According to one embodiment, each of the user systems 412 and all of its components are operator configurable using applications, such as a browser, including computer code run using a central processing unit such as an Intel Pentium® processor or the like. Similarly, the system 416 (and additional instances of an MTS, where more than one is present) and all of their components might be operator configurable using application(s) including computer code to run using a central processing unit such as the processor system 417, which may include an Intel Pentium® processor or the like, and/or multiple processor units. A computer program product embodiment includes a machine-readable storage medium (media) having instructions stored thereon/in which may be used to program a computer to perform any of the processes of the embodiments described herein.

Computer code for operating and configuring the system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), Microdrive, and magneto-optical disks, and magnetic or optical cards, nano-systems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments may be implemented in any programming language that may be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 416 is configured to provide webpages, forms, applications, data, and media content to the user (client) systems 412 to support the access by the user systems 412 as tenants of the system 416. As such, the system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations.

Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 5:
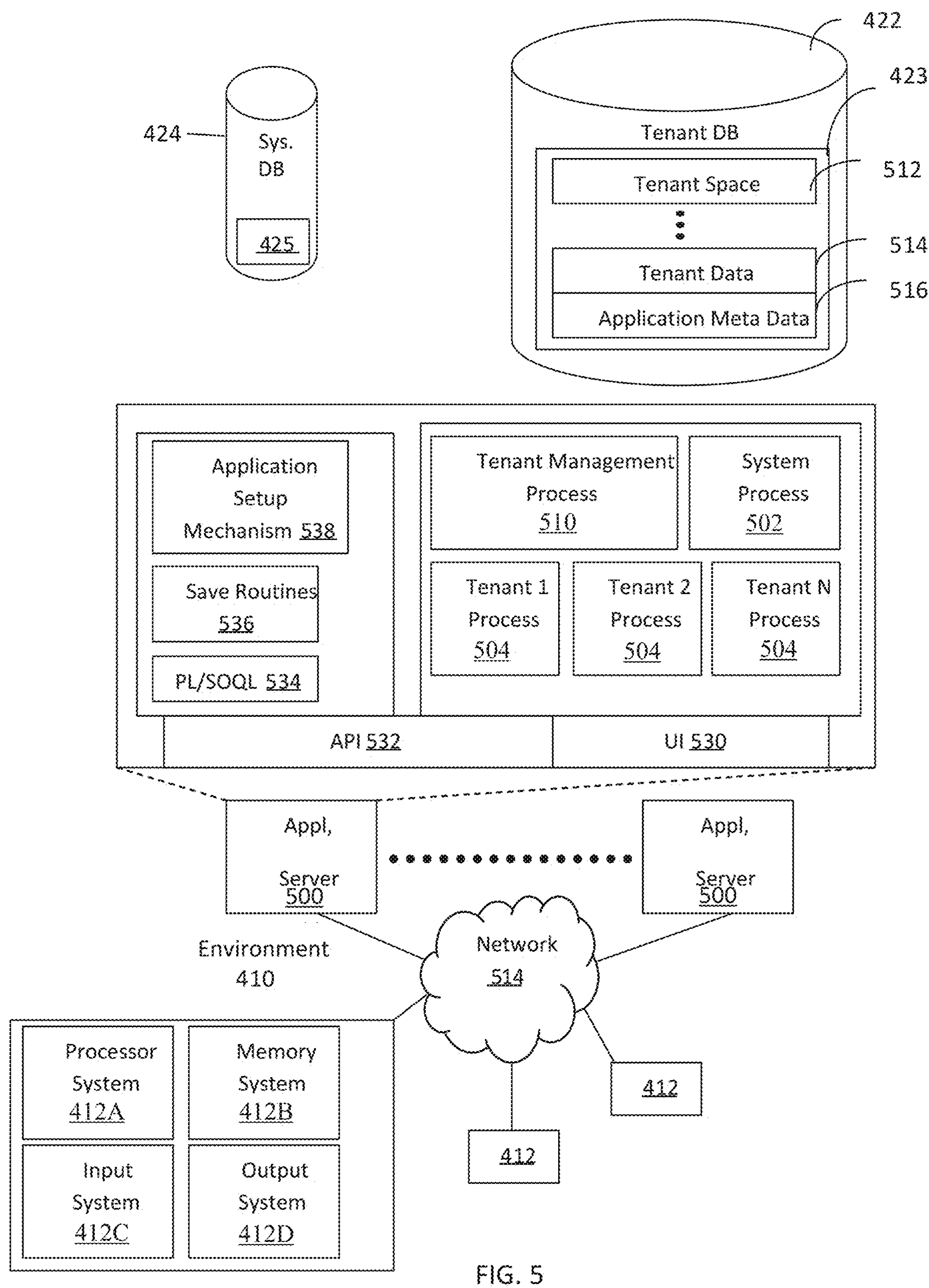
FIG. 5 illustrates a block diagram of an embodiment of elements of FIG. 3 and various possible interconnections between these elements.

FIG. 5 also illustrates the environment 410. However, in FIG. 5 elements of the system 416 and various interconnections in an embodiment are further illustrated. FIG. 5 shows that the each of the user systems 412 may include a processor system 412A, a memory system 412B, an input system 412C, and an output system 412D. FIG. 5 shows the network 414 and the system 416.

FIG. 5 also shows that the system 416 may include the tenant data storage 422, the tenant data 423, the system data storage 424, the system data 425, a User Interface (UI) 530, an Application Program Interface (API) 532, a PL/SOQL 534, save routines 536, an application setup mechanism 538, applications servers $\mathbf{500}_1$-$\mathbf{500}_N$, a system process space 502, tenant process spaces 504, a tenant management process space 510, a tenant storage area 512, a user storage 514, and application metadata 516. In other embodiments, the environment 410 may not have the same elements as those listed above and/or may have other elements instead of, or in addition to, those listed above.

The user systems 412, the network 414, the system 416, the tenant data storage 422, and the system data storage 424 were discussed above in FIG. 4. Regarding the user systems 412, the processor system 412A may be any combination of one or more processors. The memory system 412B may be any combination of one or more memory devices, short term, and/or long-term memory.

The input system 412C may be any combination of input devices, such as one or more keyboards, mice, trackballs, scanners, cameras, and/or interfaces to networks. The output system 412D may be any combination of output devices, such as one or more monitors, printers, and/or interfaces to networks. As shown by FIG. 5, the system 416 may include the network interface 420 (of FIG. 4) implemented as a set of HTTP application servers 500, the application platform 418, the tenant data storage 422, and the system data storage 424.

Also shown is the system process space 502, including individual tenant process spaces 504 and the tenant management process space 510. Each application server 500 may be configured to access tenant data storage 422 and the tenant data 423 therein, and the system data storage 424 and the system data 425 therein to serve requests of the user systems 412. The tenant data 423 might be divided into individual tenant storage areas 512, which may be either a physical arrangement and/or a logical arrangement of data. Within each tenant storage area 512, the user storage 514 and the application metadata 516 might be similarly allocated for each user.

For example, a copy of a user's most recently used (MRU) items might be stored to the user storage 514. Similarly, a copy of MRU items for an entire organization that is a tenant might be stored to the tenant storage area 512. The UI 530 provides a user interface, and the API 532 provides an application programmer interface to the system 416 resident processes to users and/or developers at the user systems 412. The tenant data and the system data may be stored in various databases, such as one or more Oracle™ databases.

The application platform 418 includes the application setup mechanism 538 that supports application developers' creation and management of applications, which may be saved as metadata into the tenant data storage 422 by the save routines 536 for execution by subscribers as one or more tenant process spaces 504 managed by the tenant management process 510 for example. Invocations to such applications may be coded using the PL/SOQL 534 that provides a programming language style interface extension to the API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 516 for the subscriber making the invocation and executing the metadata as an application in a virtual machine.

Each application server 500 may be communicably coupled to database systems, e.g., having access to the system data 425 and the tenant data 423, via a different network connection. For example, one application server $\mathbf{500}_1$ might be coupled via the network 414 (e.g., the Internet), another application server $\mathbf{500}_{N-1}$ might be coupled via a direct network link, and another application server $\mathbf{500}_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500.

In one embodiment, the load balancer uses a least connections algorithm to route user requests to the application servers 500. Other examples of load balancing algorithms, such as round robin and observed response time, also may be used. For example, in certain embodiments, 3 consecutive requests from the same user could hit 3 different application servers 500, and 3 requests from different users could hit the same application server 500. In this manner, the system 416 is multi-tenant, wherein the system 416 handles storage of, and access to, different objects, data and applications across disparate users and organizations.

As an example of storage, one tenant might be a company that employs a sales force where each salesperson uses the system 416 to manage their sales process. Thus, a user might maintain contact data, leads data, customer follow-up data, performance data, goals, and progress data, etc., all applicable to that user's personal sales process (e.g., in the tenant data storage 422). In an example of a MTS arrangement, since all of the data and the applications to access, view, modify, report, transmit, calculate, etc., may be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 416 that are allocated at the tenant level while other data structures might be managed at the user level. Because an MTS might support multiple tenants including possible competitors, the MTS should have security protocols that keep data, applications, and application use separate.

Also, because many tenants may opt for access to an MTS rather than maintain their own system, redundancy, up-time, and backup are additional functions that may be implemented in the MTS. In addition to user-specific data and tenant specific data, the system 416 might also maintain system level data usable by multiple tenants or other data. Such system level data might include industry reports, news, postings, and the like that are sharable among tenants.

In certain embodiments, the user systems 412 (which may be client systems) communicate with the application servers 500 to request and update system-level and tenant-level data from the system 416 that may require sending one or more queries to the tenant data storage 422 and/or the system data storage 424. The system 416 (e.g., an application server 500 in the system 416) automatically generates one or more SQL statements (e.g., one or more SQL queries) that are designed to access the desired information. The system data storage 424 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein.

Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc.

Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for optimizing indexes for accessing database tables and, the system comprising:

one or more processors; and a non-transitory computer readable medium storing a plurality of instructions, which when executed, cause the one or more processors to:

train a machine-learning model to determine counts of instances of a plurality of column values that are specified, respectively, for corresponding columns by any database operation on a database table and to determine an associated threshold for the plurality of column values for their corresponding columns, in response to executing a set of database operations;

identify each column value that is associated with a determined count satisfying an associated threshold as a corresponding frequently accessed column value;

create an index for each column of the database table that stores any frequently accessed column value;

insert each frequently accessed column value, stored in the columns of the database table, into a corresponding index that was created for a corresponding column, of the database table, which stores any frequently accessed column value;

determine whether the corresponding created index matches a specific column and stores any frequently accessed column value that matches a specific column value, in response to receiving a database operation that specifies the specific column value for the specific column in the database table; and access a record, which is associated with the specific column and the specific column value, via the database table by referencing a matching frequently accessed column value in a matching created index, in response to a determination that the corresponding created index matches the specific column and stores any frequently accessed column value that matches the specific column value.

2. The system of claim 1, wherein executing the set of database operations comprises executing a historical set of database operations.

3. The system of claim 2, wherein determining counts comprises retraining the machine-learning model to determine counts of instances that each column value is specified for a corresponding column by any database operations on the database table, and executing the set of database operations comprises executing a production set of database operations.

4. The system of claim 3, wherein retraining the machine-learning model to determine counts enables:

identifying an additional column value associated with any determined count that satisfies the threshold as an additional frequently accessed column value;

determining whether any optimized index has been created for a corresponding column which stores the additional frequently accessed column value;

creating an optimized index for the corresponding column which stores the additional frequently accessed column value, in response to a determination that any optimized index has not been created for the corresponding column which stores the additional frequently accessed column value; and inserting the additional frequently accessed column value into any corresponding optimized index.

5. The system of claim 3, wherein retraining the machine-learning model to determine counts enables:

identifying a frequently accessed column value associated with any historical determined count that historically satisfied a historical threshold and associated with any current determined count that currently fails to satisfy a current threshold;

determining whether an optimized index that was created for a corresponding column which stores the frequently accessed column value also stores any other frequently accessed column values;

deleting the optimized index for the corresponding column which stores the frequently accessed column value, in response to a determination that the optimized index that was created for the corresponding column which stores the frequently accessed column value does not store any other frequently accessed column values; and deleting the frequently accessed column value from optimized index for the corresponding column which stores the frequently accessed column value, in response to a determination that the optimized index that was created for the corresponding column which stores the frequently accessed column value also stores any other frequently accessed column values.

6. The system of claim 1, wherein the threshold is determined by at least one of a machine-learning model and a system administrator.

7. The system of claim 1, wherein the plurality of instructions further causes the processor to access any record, which is associated with the specific column and the specific column value, via the database table without referencing any frequently accessed column value in any optimized index, in response to a determination that at least one of any optimized index does not match the specific column and does not store any frequently accessed column value that matches the specific column value.

8. A computer program product comprising computer-readable program code to be executed by one or more processors when retrieved from a non-transitory computer-readable medium, the program code including instructions to:

train a machine-learning model to determine counts of instances of a plurality of column values that are specified, respectively, for corresponding columns by any database operation on a database table and to determine an associated threshold for the plurality of column values for their corresponding columns, in response to executing a set of database operations;

identify each column value that is associated with a determined count satisfying an associated threshold as a corresponding frequently accessed column value;

create an index for each column of the database table that stores any frequently accessed column value;

insert each frequently accessed column value, stored in the columns of the database table into a corresponding index that was created for a corresponding column, of the database table, which stores any frequently accessed column value;

determine whether the corresponding created index matches a specific column and stores any frequently accessed column value that matches a specific column value, in response to receiving a database operation that specifies the specific column value for the specific column in the database table; and access a record, which is associated with the specific column and the specific key, via the database table by referencing a matching frequently accessed column value in a matching created index, in response to a determination that the corresponding created index matches the specific column and stores any frequently accessed column value that matches the specific column value.

9. The computer program product of claim 8, wherein executing the set of database operations comprises executing a historical set of database operations.

10. The computer program product of claim 9, wherein determining counts comprises retraining the machine-learning model to determine counts of instances that each column value is specified for a corresponding column by any database operations on the database table, and executing the set of database operations comprises executing a production set of database operations.

11. The computer program product of claim 10, wherein retraining the machine-learning model to determine counts enables:

identifying an additional column value associated with any determined count that satisfies the threshold as an additional frequently accessed column value;

determining whether any optimized index has been created for a corresponding column which stores the additional frequently accessed column value;

creating an optimized index for the corresponding column which stores the additional frequently accessed column value, in response to a determination that any optimized index has not been created for the corresponding column which stores the additional frequently accessed column value; and inserting the additional frequently accessed column value into any corresponding optimized index.

12. The computer program product of claim 10, wherein retraining the machine-learning model to determine counts enables:

identifying a frequently accessed column value associated with any historical determined count that historically satisfied a historical threshold and associated with any current determined count that currently fails to satisfy a current threshold;

determining whether an optimized index that was created for a corresponding column which stores the frequently accessed column value also stores any other frequently accessed column values;

deleting the optimized index for the corresponding column which stores the frequently accessed column value, in response to a determination that the optimized index that was created for the corresponding column which stores the frequently accessed column value does not store any other frequently accessed column values; and deleting the frequently accessed column value from optimized index for the corresponding column which stores the frequently accessed column value, in response to a determination that the optimized index that was created for the corresponding column which stores the frequently accessed column value also stores any other frequently accessed column values.

13. The computer program product of claim 8, wherein the threshold is determined by at least one of a machine-learning model and a system administrator.

14. The computer program product of claim 8, wherein the program code includes further instructions to: access any record, which is associated with the specific column and the specific column value, via the database table without referencing any frequently accessed column value in any optimized index, in response to a determination that at least one of any optimized index does not match the specific column and does not store any frequently accessed column value that matches the specific column value.

15. A computer-implemented method for optimizing indexes for accessing database tables, the computer-implemented method comprising:

training a machine-learning model to determine counts of instances of a plurality of column values that are specified, respectively, for corresponding columns by any database operation on a database table and to determine an associated threshold for the plurality of column value for their corresponding columns, in response to executing a set of database operations;

identifying each column value that is associated with a determined count satisfying an associated threshold as a corresponding frequently accessed column value;

creating an index for each column of the database table that stores any frequently accessed column value;

inserting each frequently accessed column value,stored in the columns of the database table into a corresponding index that was created for a corresponding column, of the database table, which stores any frequently accessed column value;

determining whether the corresponding created index matches a specific column and stores any frequently accessed column value that matches a specific column value, in response to receiving a database operation that specifies the specific column value for the specific column in the database table; and accessing a record, which is associated with the specific column and the specific column value, via the database table by referencing a matching frequently accessed column value in a matching created index, in response to a determination that the corresponding created index matches the specific column and stores any frequently accessed column value that matches the specific column value.

16. The computer-implemented method of claim 15, wherein executing the set of database operations comprises executing a historical set of database operations, and retraining the machine-learning model to determine counts of instances that each column value is specified for a corresponding column by any database operations on the database table, and executing the set of database operations comprises executing a production set of database operations.

17. The computer-implemented method of claim 16, wherein retraining the machine-learning model to determine counts enables:

identifying an additional column value associated with any determined count that satisfies the threshold;

determining whether any index has been created for a corresponding column which stores the additional column value;

creating an index for the corresponding column which stores the additional column value, in response to a determination that any index has not been created for the corresponding column which stores the additional column value; and inserting the additional column value into any corresponding created index.

18. The computer-implemented method of claim 16, wherein retraining the machine-learning model to determine counts enables:

identifying a frequently accessed column value associated with any historical determined count that historically satisfied a historical threshold and associated with any current determined count that currently fails to satisfy a current threshold;

determining whether an optimized index that was created for a corresponding column which stores the frequently accessed column value also stores any other frequently accessed column value;

deleting the optimized index for the corresponding column which stores the frequently accessed column value, in response to a determination that the optimized index that was created for the corresponding column which stores the frequently accessed column value does not store any other frequently accessed column values; and deleting the frequently accessed column value from optimized index for the corresponding column which stores the frequently accessed column value, in response to a determination that the optimized index that was created for the corresponding column which stores the frequently accessed column value also stores any other frequently accessed column value.

19. The computer-implemented method of claim 15, wherein the threshold is determined by at least one of a machine-learning model and a system administrator.

20. The computer-implemented method of claim 15, wherein the computer-implemented method further comprises accessing any record, which is associated with the specific column and the specific key, via the database table without referencing any frequently accessed column value in any optimized index, in response to a determination that at least one of any optimized index does not match the specific column and does not store any frequently accessed column value that matches the specific column value.

* * * * *